US009244272B2

(12) United States Patent
Schultz

(10) Patent No.: US 9,244,272 B2
(45) Date of Patent: Jan. 26, 2016

(54) LIDAR SYSTEM PRODUCING MULTIPLE SCAN PATHS AND METHOD OF MAKING AND USING SAME

(71) Applicant: Pictometry International Corp., Rochester, NY (US)

(72) Inventor: Stephen L. Schultz, West Henrietta, NY (US)

(73) Assignee: Pictometry International Corp., Rochester, NY (US)

( * ) Notice: Subject to any disclaimer, the term of this patent is extended or adjusted under 35 U.S.C. 154(b) by 448 days.

(21) Appl. No.: 13/797,172

(22) Filed: Mar. 12, 2013

(65) Prior Publication Data
US 2015/0092184 A1    Apr. 2, 2015

(51) Int. Cl.
| | |
|---|---|
| G02B 26/12 | (2006.01) |
| G02B 26/10 | (2006.01) |
| G01S 17/42 | (2006.01) |
| G01S 7/481 | (2006.01) |

(52) U.S. Cl.
CPC ............... *G02B 26/12* (2013.01); *G01S 7/4817* (2013.01); *G01S 17/42* (2013.01); *G02B 26/101* (2013.01)

(58) Field of Classification Search
CPC ...... G01S 17/936; G01S 7/4817; G01S 17/88
USPC ............. 356/3.01–3.15, 4.01–4.1, 5.01–5.15
See application file for complete search history.

(56) References Cited

U.S. PATENT DOCUMENTS

| | | | | |
|---|---|---|---|---|
| 8,665,454 | B2* | 3/2014 | Fowler et al. | ................. 356/601 |
| 2002/0140924 | A1* | 10/2002 | Wangler et al. | ................. 356/28 |
| 2013/0342822 | A1* | 12/2013 | Shiraishi | ..................... 356/4.01 |

FOREIGN PATENT DOCUMENTS

JP    WO2012/117542    * 9/2012

* cited by examiner

*Primary Examiner* — Luke Ratcliffe
(74) *Attorney, Agent, or Firm* — Dunlap Codding, P.C

(57) ABSTRACT

A LiDAR system and method are disclosed, comprising a housing, a light source, a receiver, and a light deflection system comprising a light deflection element, rotatable and balanced about an axis, the element having at least three sides, at least two of the three sides having reflective surfaces, wherein at least a first side of the three sides is at a first angle in relation to the axis, and at least a second side of the three sides is at a second angle in relation to the axis, with the first angle being different from the second angle, such that light is deflectable from the reflective surface of the first and second sides out of the housing, whereby upon actuation of the light source and rotation of the light deflection element, the LiDAR system forms at least a first scan path and a second scan path.

3 Claims, 9 Drawing Sheets

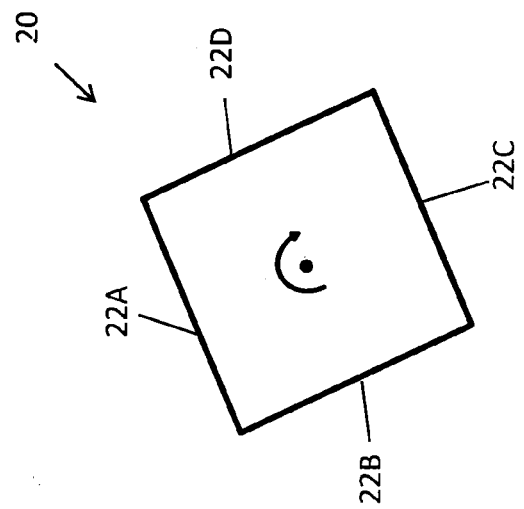
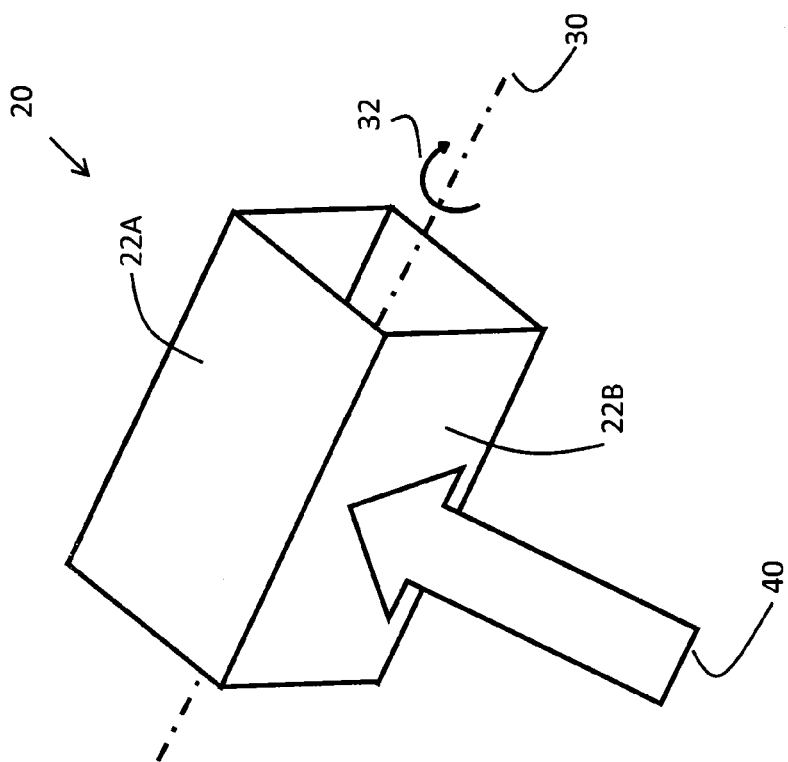
FIG. 1b
FIG. 1a
PRIOR ART

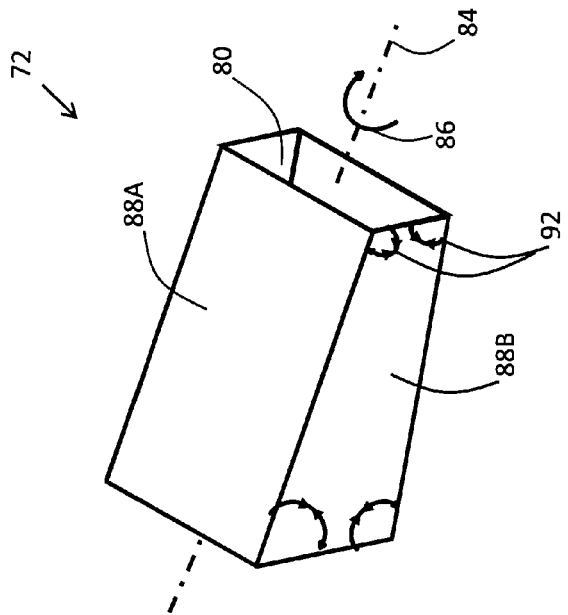
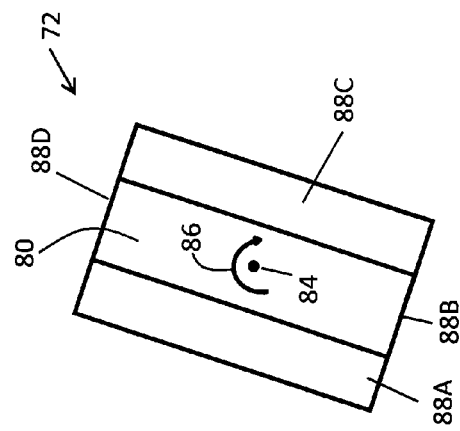
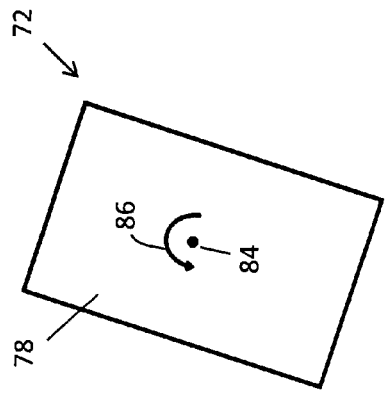
FIG. 6b
FIG. 6c
FIG. 6a

LIDAR SYSTEM PRODUCING MULTIPLE SCAN PATHS AND METHOD OF MAKING AND USING SAME

CROSS-REFERENCE TO RELATED APPLICATIONS

Not applicable.

FIELD OF THE DISCLOSURE

The disclosure generally relates to methods and apparatuses for creating multiple scan paths for a light detection and ranging (LiDAR) system. More particularly the disclosure relates to a LiDAR system designed to create multiple discrete scan paths.

BACKGROUND

Light Detection and Ranging (LiDAR) systems, also known as Laser Detection and Ranging (LaDAR) systems, in simplistic form, bounce a beam of light off a distant object and measure the precise amount of time it takes for that beam to return to the sensor.

Bouncing a light beam off of an object allows a LiDAR system to determine the distance to the object based on the speed of light and the time taken by the light to travel the distance to the object and back. In other words, LiDAR systems can be used for calculating how far the light traveled during the very short span of time from when the light beam's pulse left the laser in the system to when the light beam returned to a sensor in the system.

LiDAR systems typically include a deflection element that deflects the light beam in a specified direction before the light beam leaves the system. There are currently a number of methods to deflect the light beam with the deflection element such that the light beam sweeps or scans a path along the ground. One such method of producing this sweep is to use a rotating mirror as the deflection element.

Currently, the rotating mirrors used as deflection elements are typically an element having a cross-section in the form of a regular polygon shape in which all of the sides are the same length, such as a triangle, square, pentagon, hexagon, or other regular polygon shape. These shapes are also known as "extruded polygons" or regular polyhedrons, and can be described as a three-dimensional shape whose faces are regular polygons. The shape of a regular polyhedron may be visualized as a two-dimensional regular polygon that has been lengthened, at ninety degrees from the two-dimensional plane, so that the sides of the regular polygon have a height, forming a three-dimensional shape.

An exemplary conventional deflection element with a regular polyhedron shape is illustrated in FIG. 1a and FIG. 1b. In FIG. 1a and FIG. 1b, the deflection element has four sides A, B, C, and D. The sides of the conventional deflection element are positioned parallel to a central axis, also referred to as an optical axis, about which the conventional deflection element rotates.

As the light beam hits the surface of one of the sides of the deflection element, a reflective surface, such as a mirror, on the deflection element redirects the light beam along a path. In an aerial LiDAR system, for example one mounted on a satellite or aircraft, the path is typically perpendicular to the direction of travel of the aircraft and is typically aimed directly beneath (nadir to) the capture platform of the aircraft.

However, in some applications, it is desirable to not only acquire a directly nadir scan, but it is also desirable to capture an obliquely aimed scan, adapted to scan the vertical surfaces of buildings, structures, or other vertical objects in the path of travel.

SUMMARY

A method and system are disclosed. The problem of creating an obliquely aimed scan with light detection and ranging (LiDAR) systems is addressed through a LiDAR scanning system including a deflection element having a first end and a second end, the light deflection element rotatable and balanced about an axis extending from the first end to the second end, the light deflection element further having at least three sides extending between the first end and the second end, at least two of the three sides having reflective surfaces, wherein at least a first side of the three sides is at a first angle in relation to the axis, and at least a second side of the three sides is at a second angle in relation to the axis, with the first angle being different from the second angle, the light deflection element being rotatable about the axis such that light is deflectable from the reflective surface of the first and second sides, wherein upon actuation of a light source and rotation of the light deflection element, the LiDAR scanning system forms at least a first scan path and a second scan path.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and not every component may be labeled in every drawing. In the drawings:

FIG. 1a is an illustration of a perspective view of an exemplary conventional deflection element.

FIG. 1b is an illustration of an end view of an exemplary conventional deflection element.

FIG. 6a is an illustration of a view of the first end of the exemplary deflection element constructed in accordance with the present disclosure with four external sides, of which two sides of the deflection element are positioned at a thirty degree angle towards the axis and two sides are positioned at a zero degree angle towards (parallel to) the axis.

FIG. 6b is an illustration of a perspective view of the exemplary deflection element constructed in accordance with the present disclosure with four external sides, of which two sides of the deflection element are positioned at a thirty degree angle towards the axis and two sides are positioned at a zero degree angle towards (parallel to) the axis.

FIG. 6c is an illustration of a view of the second end of the exemplary deflection element with four external sides, of which two sides of the deflection element are positioned at a thirty degree angle towards the axis and two sides are positioned at a zero degree angle towards (parallel to) the axis.

DETAILED DESCRIPTION

Figure 2C:
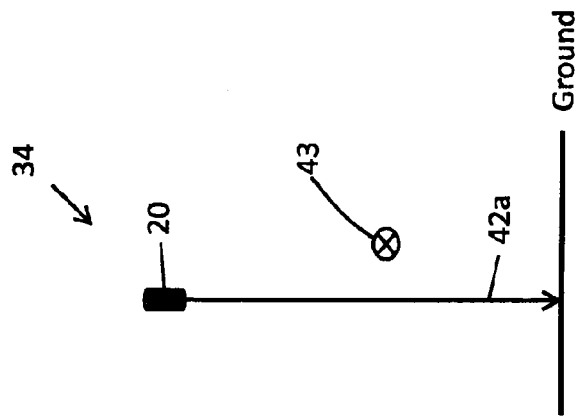
FIG. 2c is an illustration of a side view of a sweep of pulses produced by the deflection of a light beam by the exemplary conventional deflection element from a stationary platform.

The following detailed description refers to the accompanying drawings. The same reference numbers in different drawings may identify the same or similar elements.

The mechanisms proposed in this disclosure circumvent the problems described above. The present disclosure describes a light detection and ranging (LiDAR) system and method, the LiDAR system including an extruded polygon with facets with reflective surfaces, at least one the facets angled in relation to an optical axis.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As discussed above, the current technology does not provide for creating multiple discrete scan paths at different angles with light detection and ranging (LiDAR) systems. The present disclosure addresses these deficiencies with methodologies and systems including a deflection element having a first end and a second end, the light deflection element rotatable and balanced about an axis extending from the first end to the second end, the light deflection element further having at least three sides extending between the first end and the second end, at least two of the three sides having reflective surfaces, wherein at least a first side of the at least three sides has a first reflective surface and is at a first angle in relation to the axis, and at least a second side of the at least three sides has a second reflective surface and is at a second angle in relation to the axis, with the first angle being different from the second angle, the light deflection element being rotatable about the axis such that light is deflectable from the first and second reflective surface of the first and second sides, wherein upon actuation of a light source and rotation of the light deflection element, the LiDAR scanning system forms at least a first scan path and a second scan path.

FIG. 1a is an illustration of a perspective view of an exemplary conventional deflection element 20 with four sides 22 with reflective surfaces 24. FIG. 1b is an illustration of an end view of the conventional deflection element 20. The exemplary conventional deflection element 20 shown has four sides 22A, 22B, 22C, and 22D. Each side 22 is approximately parallel to a central axis 30, sometimes referred to as an optical axis, about which the conventional deflection element 20 rotates as designated by rotation arrow 32.

The LiDAR system 34 (not shown) is typically mounted to a platform above the ground, for example, on an aerial vehicle. Within the LiDAR system 34 on the platform, a light beam 40 (such as a laser beam or any appropriate light beam) is produced and aimed at the conventional deflection element 20. As the conventional deflection element 20 rotates about the axis 30, the light beam 40 hits different portions of the rotating side 22 of the conventional deflection element 20.

Figure 2B:
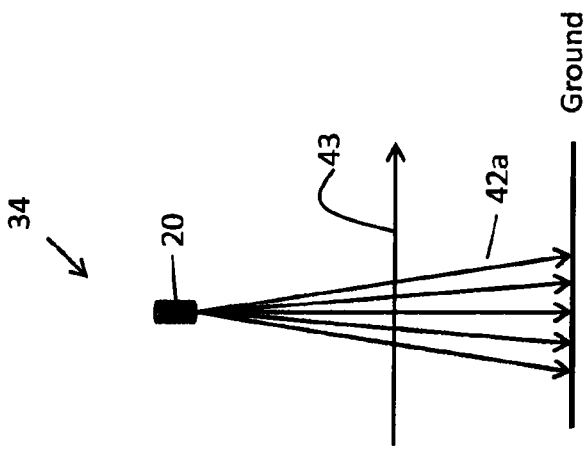
FIG. 2b is an illustration of a front view of a sweep of pulses produced by the deflection of a light beam by the exemplary conventional deflection element from a stationary platform.
Figure 2A:
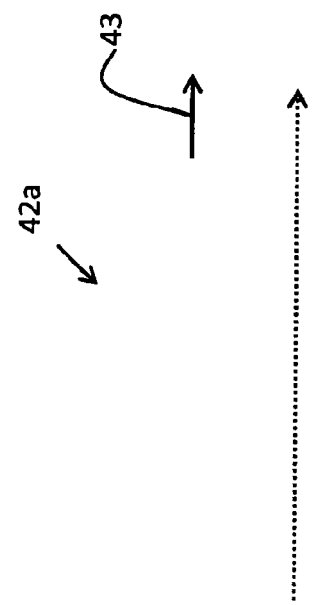
FIG. 2a is an illustration of a top view of a sweep of pulses produced by the deflection of a light beam by the exemplary conventional deflection element from a stationary platform.

FIG. 2a, FIG. 2b, and FIG. 2c illustrate a top view, a front view, and a side view, respectively, of a sweep of pulses, that is, a scan path 42a, produced by the deflection of the light beam 40 by an exemplary conventional deflection element 20 from a stationary LiDAR system 34. As illustrated in FIG. 2a, the deflection of the light beam 40 by different portions of the rotating side 22 of the conventional deflection element 20 causes the deflected light beam 40 to progress across the ground in scan path 42a below the LiDAR system 34, with the progression of the scan path 42a in points going from left to right or right to left, depending on the direction of rotation of the conventional deflection element 20. FIG. 2a depicts the scan path 42a going from left to right, from a top view; arrow 43 indicates the direction of the scan path 42a. FIG. 2b depicts the LiDAR system 34 with conventional deflection element 20

When the deflection element 20 rotates such that the light beam bounces off the next side of the deflection element 20, the progression of the light beam 40 across the ground jumps back to the beginning of the same scan path 42a, the same points on the ground, for example, to the left. If the LiDAR system 34 is stationary, the LiDAR system 34 would repeatedly scan the same points on the ground, referred to as a scan line or scan path 42a. Each subsequent sweep is still aimed straight down when viewed perpendicularly to the direction of travel, as illustrated in FIG. 2c depicting a side view of LiDAR system 34 with deflected light beam 40.

Figure 3A:
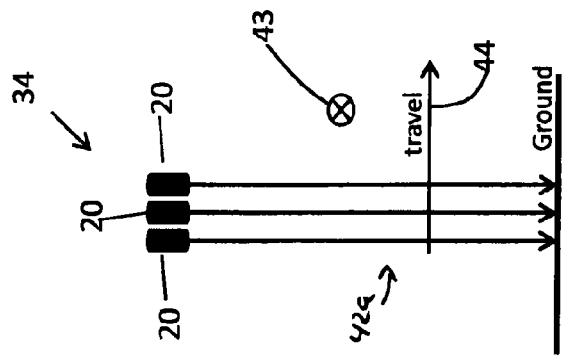
FIG. 3a is an illustration of a top view of multiple sweeps of pulses produced by the deflection of a light beam by the exemplary conventional deflection element from a moving platform.
Figure 3B:
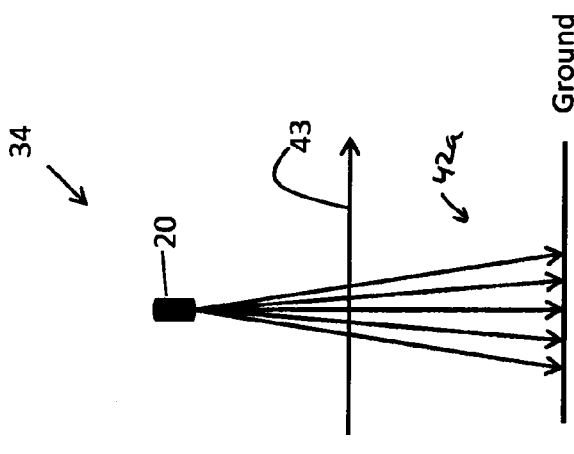
FIG. 3b is an illustration of a front view of multiple sweeps of pulses produced by the deflection of a light beam by the exemplary conventional deflection element from a moving platform.
Figure 3C:
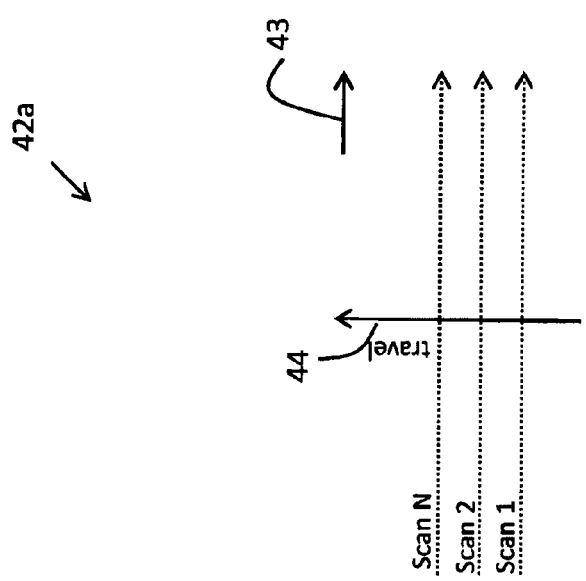
FIG. 3c is an illustration of a side view of multiple sweeps of pulses produced by the deflection of a light beam by the exemplary conventional deflection element from a moving platform.

FIG. 3a, FIG. 3b, and FIG. 3c illustrate a top view, a back view, and a side view, respectively, of a scan path 42a (sweep of pulses) produced by the deflection of the light beam 40 by the deflection element 20 from the LiDAR system 34 when the LiDAR system 34 is moving. If the LiDAR system 34 has a forward motion of direction, then the scan path 42a of the deflected light beam 40 gains a slight forward location due to the forward motion. Therefore, when the light beam 40 is bounced off the second side 22B of the rotating conventional deflection element 20, the light beam 40 is still redirected back to the beginning of the scan path 42a (the beginning of the sweep of pulses); however, the light beam 40 is now deflected slightly forward along the direction of travel from the scan path 42a produced by the first side 22A of the deflection element 20. FIG. 3a and FIG. 3c depict scan path 42a at three different positions of the LiDAR system 34, and thus of the deflection element 20. Note the arrow 44 indicates direction of travel of the LiDAR system 34.

Through the forward movement of the LiDAR system 34, the LiDAR system 34 is able to scan a swath of area with multiple scan paths 42a. The data gathered from the scan may be used to create a digital elevation map of the ground.

For scanning in a nadir direction, that is, approximately straight down from the LiDAR system 34, the LiDAR system 34 is oriented such that the light beam 40, when at the centerline of the scan, is aimed directly nadir to the LiDAR system 34, as illustrated in FIG. 2c and FIG. 3c. Because of the direction of the scan, scanning with a conventional deflection element 20 in the nadir direction does not capture the vertical surfaces of buildings, structures, or other vertical objects in the path of travel.

Figure 4:
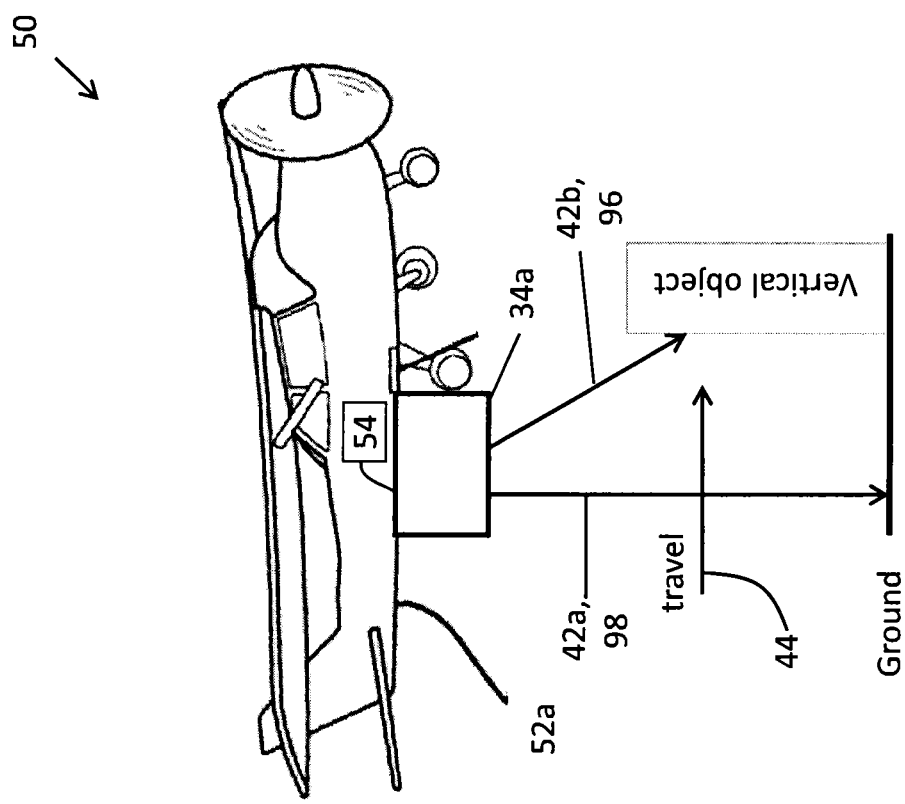
FIG. 4 is an illustration of an exemplary ranging system constructed in accordance with the present disclosure with at least two different scans and with a first scan being a nadir scan and a second scan being an oblique scan.

An oblique scan path is adapted to scan vertical surfaces as well as horizontal surfaces. FIG. 4 is an illustration of an exemplary ranging system 50 with multiple scan path 42 angles, in this example, a scan path 42a nadir to the ranging system 50 and a scan path 42b at an oblique angle to the ranging system 50. The ranging system may comprise a vehicle 52, a light detection and ranging (LiDAR) scanning system 34a carried by the vehicle 52, and a computer 54. The vehicle may be an airplane 52a as shown in FIG. 4, or any type of appropriate vehicle, such as a helicopter, aircraft, satellite, marine vehicle, robot, or automobile. The computer 54 may contain computer instructions stored on a non-transitory computer readable medium and adapted to determine information from the data provided by the LiDAR scanning system 34a, such as calculation of distance. The non-transitory computer readable medium can be random access memory, read only memory, flash memory, optical memory or the like and can be formed by one or more discrete components which are preferably logically linked together.

The LiDAR scanning system 34a may be carried by the vehicle 52 in any appropriate manner, such as attachment to the bottom of the vehicle 52, or attachment to a wing of the vehicle 52 when the vehicle 52 is an aircraft.

Figure 5:
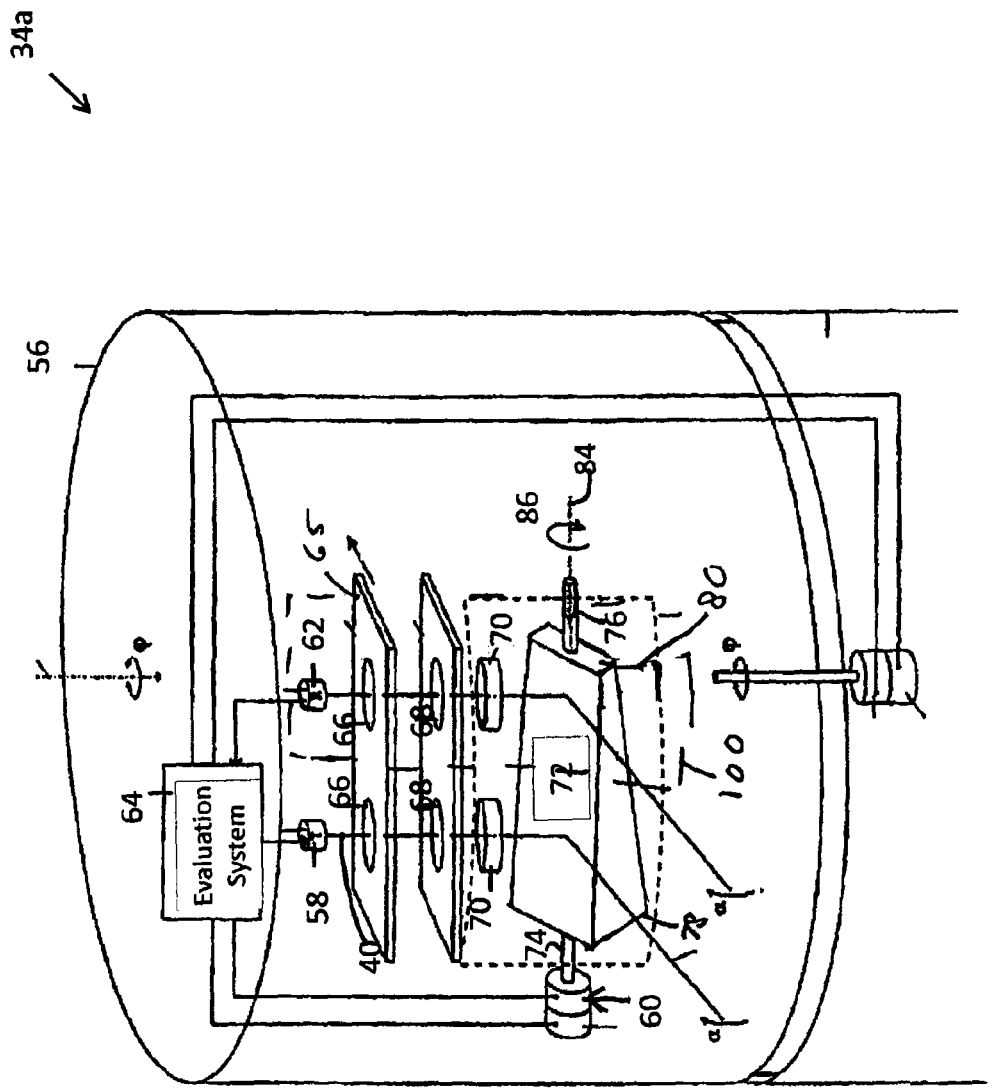
FIG. 5 is an illustration of an exemplary LiDAR scanning system constructed in accordance with the present disclosure.

FIG. 5 is an illustration of an exemplary LiDAR scanning system 34a constructed in accordance with the present disclosure. The LiDAR scanning system 34a may comprise a housing 56, a light source 58 within the housing 56, a light deflection system 60 within the housing 56, and a receiver 62 within the housing 56. The LiDAR scanning system 34a may also comprise an evaluation system 64 within the housing 56, such as one or more computer(s) containing computer instructions, including instructions adapted to determine distance from data gathered by the LiDAR scanning system 34a, such as from a calculated time of travel of the light beam 40 from the light source 58 to an object to be scanned in the scan path 42 and back to the receiver 62. The computer of the evaluation system 64 may be in addition to, or in place of, the computer 54 of the ranging system 50. The evaluation system 64 may include instructions and/or firmware running on the computer.

The light source 58 of the LiDAR scanning system 34a is adapted to transmit light beams 40. Any appropriate light source 58 may be used, for example, laser systems or light emitting diodes. The light source 58 transmits light beams 40 to the light deflection system 60. In one embodiment, the light source 58 transmits the light beams 40 to the light deflection system 60 through a transmitter channel 65 which may include lens systems 66, light dampening elements 68, and optical systems 70. As discussed above, and referring again to FIG. 5, the LiDAR scanning system 34a may also comprise the receiver 62.

The receiver 62 is adapted to receive the light beam 40 after reflection from the scan paths 42. In one embodiment, before being received by the receiver 62, the light beam 40 after reflection from the scan paths 42 returns to the light deflection element 72 which deflects the light beam 40 back to the receiver 62. Or the light beam 40 may be deflected by a second light deflection element 72a. The light may also travel through a receiver channel 100 which may comprise optical components such as lens systems 66, light dampening elements 68, and optical systems 70, before returning to the receiver 62.

The light deflection system 60 of the LiDAR scanning system 34a may comprise a light deflection element 72, a first connector 74, and a second connector 76. The first connector 74 of the light detection system 60 may be aligned with the axis 84 (as shown in FIG. 5) of the light deflection element 72 on the first end 78 of the light deflection element 72 and the second connector 76 of the light detection system 60 may be aligned with the axis 84 on the second end 80 of the light detection element 72. The connectors 74 and 76 may be any appropriate connector, as is well known in the art, for example, tabs, threaded holes, threaded protrusions, splines, and so on. The connectors 74 and 76 may be used to attach the light deflection element to a rotation device, such as a motor. In one embodiment, the light detection system 60 may only include one connector 74.

Figure 6E:
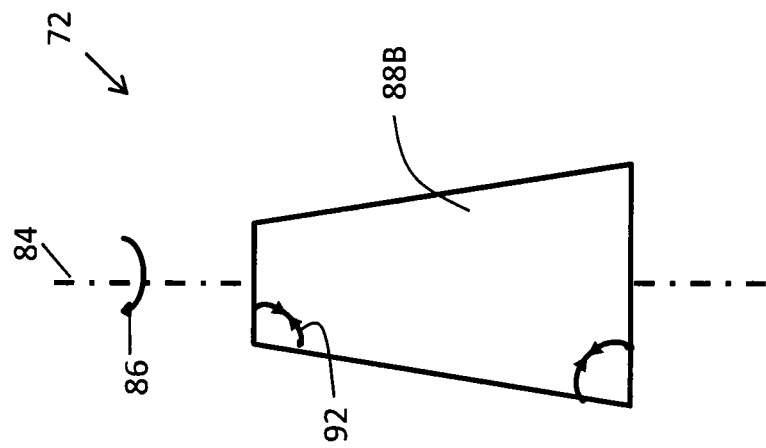
FIG. 6e is an illustration of a view of the second side of the exemplary deflection element constructed in accordance with the present disclosure with four external sides, of which two sides of the deflection element are positioned at a thirty degree angle towards the axis and two sides are positioned at a zero degree angle towards (parallel to) the axis.

FIG. 6a, FIG. 6b, FIG. 6c, FIG. 6d, and FIG. 6e, illustrate the exemplary light deflection element 72. FIG. 6b illustrates a perspective view of the light deflection element 72. The light deflection element 72 may have a first end 78 and a second end 80. The light deflection element 72 is rotatable and balanced about the axis 84, which preferably extends from the first end 78 to the second end 80. FIGS. 6a and 6c illustrate a view of the first end 78 and the second end 80, respectively. Direction of rotation is depicted by rotation arrow 86.

Figure 6D:
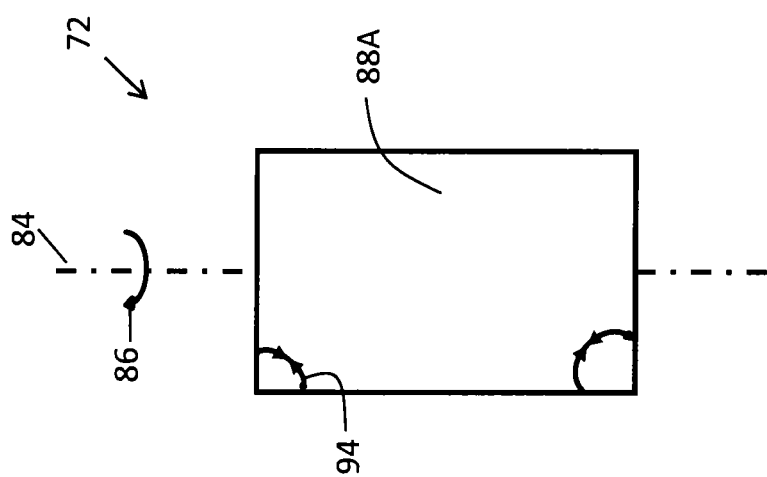
FIG. 6d is an illustration of a view of the first side of the exemplary deflection element constructed in accordance with the present disclosure with four external sides, of which two sides of the deflection element are positioned at a thirty degree angle towards the axis and two sides are positioned at a zero degree angle towards (parallel to) the axis.

Further, the light deflection element 72 may have at least three sides 88 extending between the first end 78 and the second end 80. FIGS. 6d and 6e illustrate a view of the first side 88A and the second side 88B, respectively. The light deflection element 72 may be solid or hollow. At least two of the three sides 88 of the light deflection element have reflective surfaces (not shown), such as mirrored surfaces, or any other appropriate reflective surface. The reflective surface may be attached to the sides 88 or may be a part of the sides 88, for example, the sides 88 may be constructed of or coated with a reflective metal substance.

At least a first side 88A of the three sides of the light deflection element is at a first angle 92 in relation to the axis 84, and at least a second side 88B of the three sides 88 is at a second angle 94 in relation to the axis 84. The first angle 92 is different from the second angle 94. The light deflection element 72 may have different angles on each of the at least three sides 88. In one example, as will be further discussed below, the light deflection element 72 has six sides 88 that are positioned at three different angles.

Figure 7:
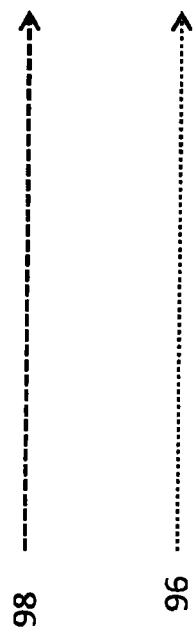
FIG. 7 is an illustration of the sweep of pulses produced by the exemplary LiDAR scanning system from a stationary platform, including a deflection element with four external sides, of which two sides of the deflection element are positioned at a first angle in relation to the axis of the deflection element and two sides are positioned at a second angle in relation to the axis.

The light deflection element 72 is rotatable about the axis 84 such that light is deflectable from the reflective surface 90 of the first and second sides 88A and 88B out of the housing 56. Upon actuation of the light source 58 and rotation of the light deflection element 72, the LiDAR scanning system 34a forms at least a first scan path 96 and a second scan path 98, as the light is deflected from the differing angles of the at least first side 88A and second side 88B of the light deflection element 72, as depicted in FIG. 7.

In FIGS. 6a-6e, the exemplary deflection element 72 constructed in accordance with the present disclosure is shown with four external sides 88 where the first side 88A and the third side 88C are at the first angle 92 in relation to the axis 84 of the light deflection element 72, and the second side 88B and the fourth side 88D are at the second angle 94 in relation to the axis 84. For example, the first angle 92 may be a thirty degree angle towards the axis 84 (that is, the sides are tilted thirty degrees) and the second angle 94 may be a zero degree angle towards (parallel to) the axis 84. In other words, if measured from the first end 78 of the light deflection element 72, the first side 88A and third side 88C are positioned sixty degrees from the first end 78 and the second side 88B and fourth side 88D are positioned ninety degrees from the first end 78.

With the configuration described above, when the light deflection element 72 is rotated, the light beam 40 striking the sides 88 is deflected by the first and the third sides 88A and 88C to form the first scan path 96 and by the second and the fourth sides 88B and 88D to form the second scan path 98, such that the first scan path 96 and the second scan path 98 are at different angles, as illustrated in FIG. 4.

If the LiDAR scanning system 34a is stationary, the exemplary rotating light deflection element 72 describe above would deflect the light beam 40 to produce two repeating scan paths—a first scan path 96 thirty degrees in front of the LiDAR scanning system 34a and a second scan path 98 directly beneath the LiDAR scanning system 34a. FIG. 7 is an illustration of the scan paths 96 and 98 (the sweeps of pulses) produced by the exemplary light deflection system 60, in which the first scan path 96 is offset in front of (at an oblique angle to) the LiDAR scanning system 34a and the second scan path 98 is approximately ninety degrees to (nadir to) the LiDAR scanning system 34a.

Figure 8:
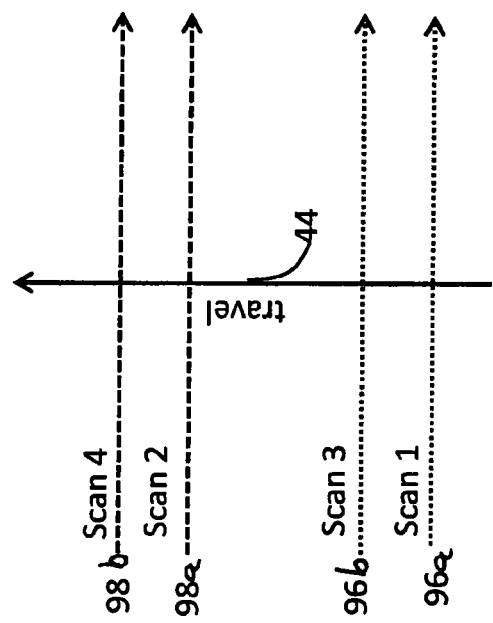
FIG. 8 is an illustration of the sweep of pulses produced by the system from a forward moving platform, including the deflection element with the four external facets.

If the exemplary LiDAR scanning system 34a described above were moving forward in the manner discussed previously, the light deflection system 60 would produce alternating first and second scan paths 96 and 98; again with the first scan path 96 that swept an area thirty degrees in front of (oblique to) the moving LiDAR scanning system 34a and the second scan path 98 that swept an area is approximately ninety degrees to (nadir to) the moving LiDAR scanning system 34a. FIG. 8 is an illustration of the repeating scan paths 96 and 98 produced by an exemplary forward moving LiDAR scanning system 34a. The rotating light deflection element 72 with the four sides and angles described above would produce alternating nadir and oblique scan paths 96 and 98 moving forward with the forward motion of the LiDAR scanning system 34a.

For example, when the four-sided light deflection element 72 rotates within the forward moving LiDAR scanning system 34a, the light beam 40 is deflected from the first side 88A, where the first side 88A is at the first angle 92 of thirty degrees, such that the light deflection element 72 would produce the first scan path 96a at an oblique angle to the LiDAR scanning system 34a. Then, as the light deflection element 72 continues to rotate, the light beam 40 would be deflected from the second side 88B, the second side 88B at the second angle of zero degrees, and would produce a second scan path 98a nadir to the LiDAR scanning system 34a. Next, when the light deflection element 72 rotates to the third side 88C, the light beam 40 would be deflected from the third side 88C, the third side 88C also at the first angle 92 of thirty degrees, producing a third scan path 96b at an oblique angle to the LiDAR scanning system 34a, but forward from the first scan path 96a, in the direction of travel of the LiDAR scanning system 34a. Similarly, when the rotating deflection element 72 rotates to the fourth side 88D, the light beam 40 would be deflected from the fourth side 88D, the fourth side 88D also at the second angle 94 of zero degrees and would produce a fourth scan path 98b nadir to the LiDAR scanning system 34a, but forward from the second scan path 98a, in the direction of travel of the LiDAR scanning system 34a. This pattern would then repeat as the light deflection element 72 continued to rotate.

The oblique angle scan paths, such as scan path 98 described above, can be used to scan vertical surfaces as well as horizontal surfaces. For example, vertical surfaces of natural or man-made structures can be scanned.

For illustrative purposes, a four-sided polygonal light deflection element 72 has initially been described; however, it should be understood that the description applies equally to light deflection elements 72 with three or more sides 88. For example, the light deflection element 72 could be six-sided with two different angled sides 88, or any number of sides 88 that could produce multiple discrete scan paths 102.

Similarly, for illustrative purposes, the described exemplary light deflection element 72 produced two different scan paths 96 and 98 by having only two differing angles 92 and 94 of the sides 88, but it should be understood that the description applies equally to light deflection elements 72 with more than two different angles of the sides 88. For instance, a triangular light deflection element 72 could be used where each side 88 had a different angle, resulting in three different scan paths 102. Or, for instance, a six-sided light deflection element 72 with six different angled sides 88 could produce six different scan paths 102. Or, for instance, an eight-sided light deflection element 72 with six different angled sides 88 could produce six different scan paths 102.

Figure 9:
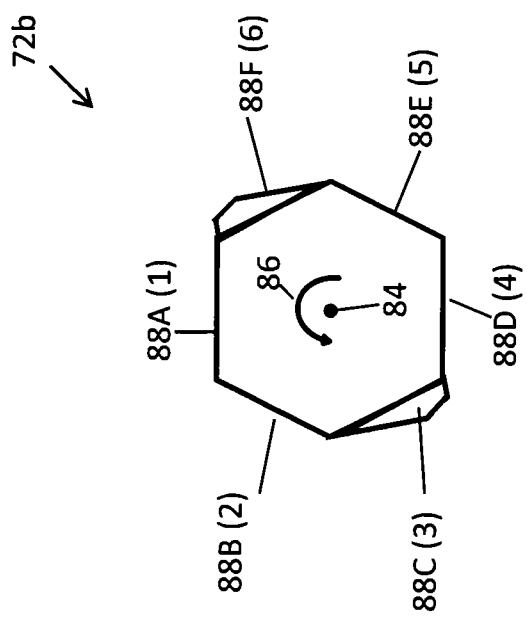
FIG. 9 is an illustration of a view of the first end of the exemplary deflection element with six sides, of which two sides of the deflection element are positioned at a thirty degree angle towards the axis, two sides are positioned at a negative twenty-five degree angle towards the axis, and two sides are positioned at a zero degree angle towards the axis (that is, parallel to the axis).

Additionally, a balanced light deflection element 72 minimizes vibration in the light deflection element 72 during rotation. To maintain balance of the light deflection element 72, a configuration may be used in which opposite sides 88 have the same angle. In one example, as illustrated in FIG. 9, if three scan paths 102 were desired, a hexagonal light deflection element 72b could be used, such as a light deflection element 72b with six sides 88A through 88F with sides 88A and 88D having a zero-degree angle in relation to the axis 84 in order to scan directly beneath the LiDAR scanning system 34a, sides 88B and 88E having a thirty degree angle in relation to the axis 84 in order to scan in front of the LiDAR scanning system 34a, and sides 88C and 88F having a negative twenty-five degree angle in relation to the axis 84 in order to scan in back of the LiDAR scanning system 34a. FIG. 9 illustrates an end view of one such exemplary hexagonal light deflection element 72b. Of course, one skilled in the art would understand that a cross-section of the exemplary light deflection element 72b would be a six-sided polygon with unequal length sides because of the angles of the sides 88 in relation to the axis 84.

Further, it should be understood that a configuration having opposite sides 88 having the same angles as described above is one configuration to aid in balancing a light deflection element 72, however, there are other balancing configurations possible. For example, the light deflection element 72 can be balanced using varying thicknesses of material. For example, the placement of weights may be used in order to balance the light deflection element 72 for rotation.

CONCLUSION

Conventionally, LiDAR systems utilize a rotating polygon mirror to deflect light beams to produce scans in a single scan direction typically aimed in a nadir direction. In accordance with the present disclosure, a method and an apparatus are described including a light deflection element having a first end and a second end, the light deflection element rotatable and balanced about an axis extending from the first end to the second end, the light deflection element further having at least three sides extending between the first end and the second end, at least two of the three sides having reflective surfaces, wherein at least a first side of the three sides is at a first angle in relation to the axis, and at least a second side of the three sides is at a second angle in relation to the axis, with the first angle being different from the second angle, the light deflection element being rotatable about the axis such that light is deflectable from the reflective surface of the first and second sides, wherein upon actuation of a light source and rotation of the light deflection element, the LiDAR scanning system forms at least a first scan path and a second scan path.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

What is claimed is:

1. A ranging system comprising:
   an aircraft;
   a light detection and ranging (LiDAR) scanning system carried by the aircraft, comprising:
      a housing;
      a light source within the housing adapted to transmit light;
      a light deflection system within the housing comprising:
      a light deflection element rotatably supported within the housing and having a first end and a second end, the light deflection element rotatable and balanced about an axis extending from the first end to the second end, the light deflection element further having at least three sides extending between the first end and the second end, at least a first side of the at least three sides has a first reflective surface at a first angle in relation to the axis, and at least a second side of the at least three sides has a second reflective surface at a second angle in relation to the axis, with the first angle being different from the second angle, the light deflection element being rotatable about the axis such that light is deflectable from the first and second reflective surfaces of the first and second sides;
   wherein upon actuation of the light source and rotation of the light deflection element, the LiDAR scanning system forms at least a first scan path and a second scan path; and
   a receiver within the housing adapted to receive the light after reflection from the scan paths; and
   a computer having computer instructions adapted to determine and store distance from a calculated time of travel of the light from the light source to an object to be scanned in the scan paths and back to the receiver;
   wherein the first scan path is at a first angle in relation to the LiDAR scanning system and the second scan path is at a second angle in relation to the LiDAR scanning system, where the first angle is nadir relative to the aircraft and the second angle is oblique relative to the first angle.

2. The ranging system of claim 1, wherein the computer has computer instructions adapted to create a digital elevation map of the ground.

3. The ranging system of claim 1, wherein the computer has computer instructions adapted to create a digital elevation map of the ground, and vertical and horizontal surfaces above the ground.

\* \* \* \* \*